US008918593B2

(12) United States Patent
Khandai et al.

(10) Patent No.: US 8,918,593 B2
(45) Date of Patent: *Dec. 23, 2014

(54) METHOD AND SYSTEM FOR MEMORY MANAGEMENT

(71) Applicant: QLOGIC, Corporation, Aliso Viejo, CA (US)

(72) Inventors: Biswajit Khandai, Foothill Ranch, CA (US); Oscar L. Grijalva, Cypress, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/036,920

(22) Filed: Sep. 25, 2013

(65) Prior Publication Data

US 2014/0089455 A1    Mar. 27, 2014

Related U.S. Application Data

(63) Continuation of application No. 13/238,485, filed on Sep. 21, 2011, now Pat. No. 8,572,328.

(51) Int. Cl.
*G06F 13/00* (2006.01)
*G06F 13/28* (2006.01)
*H04L 29/08* (2006.01)
*G06F 12/02* (2006.01)

(52) U.S. Cl.
CPC ............ *H04L 67/1097* (2013.01); *G06F 12/02* (2013.01); *G06F 13/00* (2013.01)
USPC ..................... 711/147; 711/130; 711/E12.002

(58) Field of Classification Search
USPC .................................. 711/147, 130, E12.002
See application file for complete search history.

(56) References Cited

U.S. PATENT DOCUMENTS

| 7,720,064 | B1* | 5/2010 | Rohde | 370/389 |
|---|---|---|---|---|
| 8,572,328 | B2* | 10/2013 | Khandai et al. | 711/147 |
| 2005/0141516 | A1* | 6/2005 | Sinha et al. | 370/395.7 |
| 2009/0182948 | A1* | 7/2009 | Jiao et al. | 711/133 |

OTHER PUBLICATIONS

"International Search Report from ISA/US dated Nov. 16, 2012 for International Application No. PCT/US2012/054919".
"Written Opinion from ISA/US dated Nov. 16, 2012 for International Application No. PCT/US2012/054919".
"Office Action from USPTO dated Apr. 12, 2013 for U.S. Appl. No. 13/238,485".
"Notice of Allowance fro USPTO dated Aug. 22, 2013 for U.S. Appl. No. 13/238,485".

* cited by examiner

*Primary Examiner* — Edward Dudek, Jr.
(74) *Attorney, Agent, or Firm* — Klein, O'Neill & Singh, LLP

(57) ABSTRACT

A single-ported memory for storing information and only accessible to a plurality of clients, and a dual-ported memory for storing links and accessible to the plurality of clients and to a list manager that maintains a data structure for allocating memory blocks from the first memory and the second memory to the plurality of clients. The dual-ported memory is accessible to both the plurality of clients and the list manager. A method includes receiving a request from a client for access to memory storage at the single-ported memory and the dual-ported memory, and allocating a block of the single-ported memory to the client and a block of the dual-ported memory to the client. After the client has used the memory storage, the allocated block of the single-ported memory and the dual-ported memory are released to a free list data structure used by the list manager to assign storage.

20 Claims, 5 Drawing Sheets

METHOD AND SYSTEM FOR MEMORY MANAGEMENT

CROSS-REFERENCE TO RELATED APPLICATION

This application is a continuation of application Ser. No. 13/238,485, filed on Sep. 21, 2011, the entire contents of which are hereby incorporated by reference.

TECHNICAL FIELD

The present embodiments relate to memory devices and associated methods thereof.

BACKGROUND

A computer network, often simply referred to as a network, typically includes a group of interconnected computers and devices that facilitate communication between users and allows users to share resources. Most computing devices use memory for storing information and executing instructions. Typically the memory includes a plurality of blocks for storing information on behalf of multiple clients. Continuous efforts are being made to improve memory management.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide various advantages.

One embodiment comprises a machine implemented method. The method comprises providing a first memory slice having a plurality of blocks configured for storing information on behalf of a plurality of clients. The first memory slice is a single-port memory that is only accessible to the plurality of clients. The method further comprises configuring a second memory slice having a plurality of blocks for storing links and accessible to the plurality of clients and to a list manager that maintains a data structure for allocating memory blocks from the first memory slice and the second memory slice to the plurality of clients. The second memory slice is accessible to both the plurality of clients and the list manager. The method further comprises receiving a request from a client for access to memory storage at the first memory slice and the second memory slice. The method further comprises allocating a block of the first memory slice to the client and a block of the second memory slice to the client. The method further comprises storing a link for a next available memory block at the second memory slice. The list manager allocates the block of the first memory slice and stores the link at the second memory slice.

Another embodiment comprises a machine implemented method. The method comprises receiving a request from a client from among a plurality of clients for access to memory storage at a first memory slice and a second memory slice. The first memory slice is accessible only to the plurality of clients and includes a plurality of blocks configured for storing information on behalf of the plurality of clients. The second memory slice includes a plurality of blocks for storing links, and is accessible to the plurality of clients and to a list manager that maintains a data structure for allocating memory blocks from the first memory slice and the second memory slice to the plurality of clients. The second memory slice is accessible to both the plurality of clients and the list manager. The method further comprises allocating a block of the first memory slice and a block of the second memory slice to the client. The method further comprises storing a link for a next available memory block at the second memory slice. The list manager allocates the block of the first memory slice and stores the link at the second memory slice.

Another embodiment comprises a device. The device comprises a single-ported first memory slice accessible only to a plurality of clients and includes a plurality of blocks configured for storing information on behalf of the plurality of clients. The device further comprises a dual-ported second memory slice having a plurality of blocks for storing links and accessible to the plurality of clients and to a list manager that maintains a data structure for allocating memory blocks from the first memory slice and the second memory slice to the plurality of clients. In response to a client request, the list manager allocates a block of the first memory slice and a block of the second memory slice to the client, and stores a link for a next available memory block at the second memory slice.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various present embodiments now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
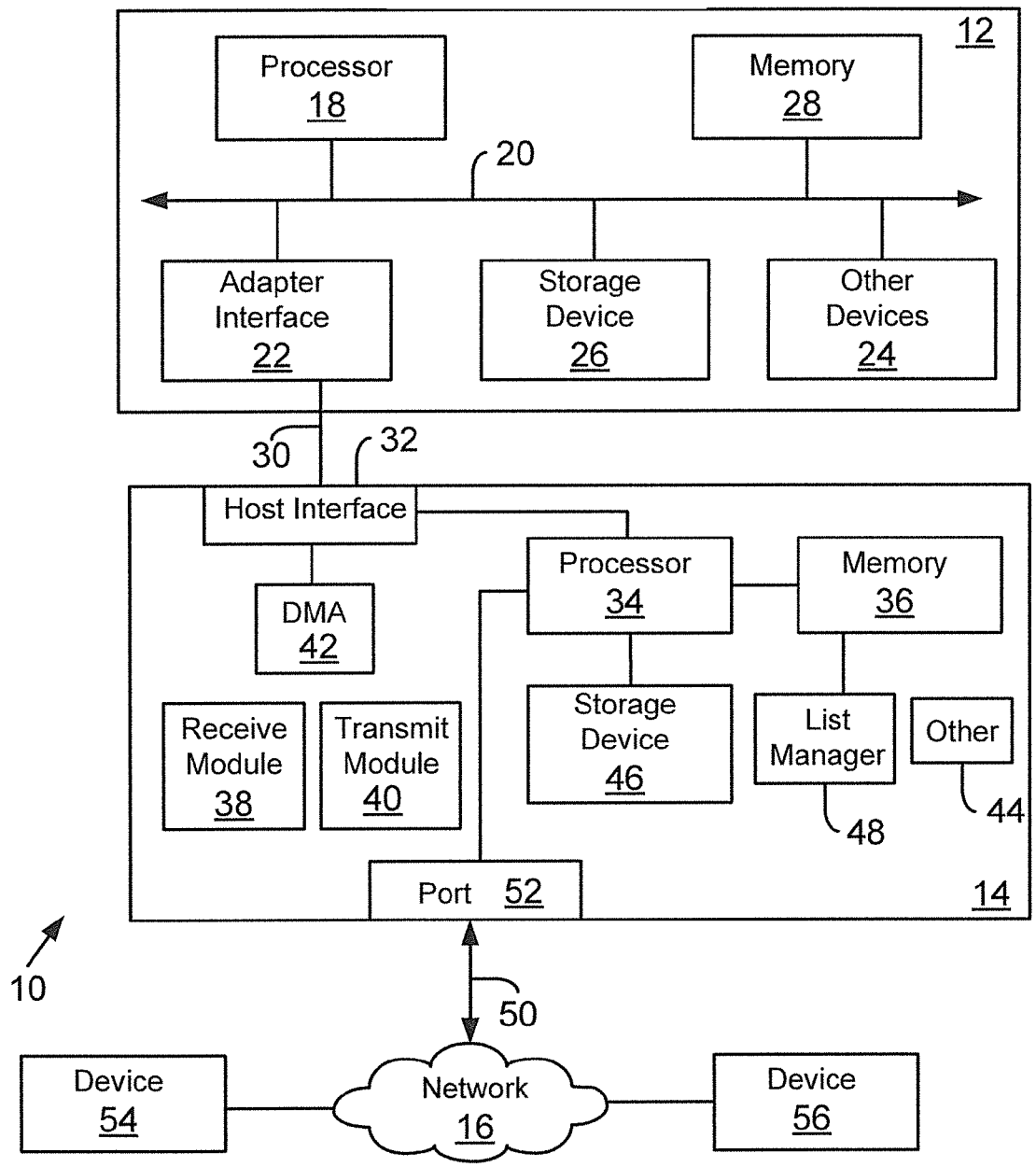
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms logic, module, component, system, and functionality represent machine executable code that performs specified tasks when executed on a processing device or devices (e.g., hardware based central processing units). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be readable by a computing system, and encoding a computer program of instructions for executing a computer process.

System 10:

FIG. 1A shows a block diagram of a system configured for use with the various embodiments described herein. System 10 includes a computing system 12 (may also be referred to as "host system 12") coupled to an adapter 14 that interfaces with a network 16 for communicating with other devices 54 and 56. The network 16 and devices 54 and 56 may include, for example, additional computing systems, servers, storage systems, storage devices, and other devices.

The computing system 12 may include one or more processors 18, also known as a hardware-based, central processing unit (CPU). The processor 18 executes computer-executable process steps out of a memory 28 and interfaces with an interconnect 20, which may also be referred to as a computer bus 20. Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The computer bus 20 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of interconnect.

An adapter interface 22 enables computing system 12 to interface with adapter 14, as described below. The computing system 12 also includes other devices and interfaces 24, which may include a display device interface, a keyboard interface, a pointing device interface, etc. The details of these components are not germane to the inventive embodiments.

The computing system 12 may further include a storage device 26, which may be for example a hard disk, a CD-ROM, a non-volatile memory device (flash or memory stick) or any other device. Storage 26 may store operating system program files, application program files, and other files. Some of these files are stored on storage 26 using an installation program. For example, the processor 18 may execute computer-executable process steps of an installation program so that the processor 18 can properly execute the application program.

Memory 28 interfaces with the computer bus 20 to provide processor 18 with access to memory storage. Memory 28 may include random access main memory (RAM). When executing stored computer-executable process steps from storage 26, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, a link 30 and the adapter interface 22 couple adapter 14 to the computing system 12. The adapter 14 may be configured to send and receive network traffic complying with one or more protocols/standards, for example, Ethernet, Gigabit Ethernet, Transmission Control Protocol (TCP), Internet Protocol (IP), Fibre Channel (FC), Fibre Channel over Ethernet (FCOE), InfiniBand (IB), iSCSI and others.

The adapter 14 interfaces with the computing system 12 via a host interface 32. In one embodiment, the host interface may be a Peripheral Component Interconnect (PCI) Express interface coupled to a PCI Express link (for example, link 30).

Adapter 14 includes a processor 34 that executes firmware instructions out of memory 36 to control overall adapter 14 operations. The adapter 14 may also include storage 46, which may be for example non-volatile memory, such as flash memory, or any other device. The storage 46 may store executable instructions and operating parameters that can be used for controlling adapter operations.

The adapter 14 includes a port 52 that interfaces with a link 50 for sending and receiving information. In one embodiment, port 52 includes logic and circuitry for handling information that is sent and received by adapter 14. The structure of the logic and circuitry would depend on the link type and the protocol(s) used by adapter 14. Port 52 may include memory storage locations, referred to as memory buffers (not shown) to temporarily store information received from or transmitted to other network devices.

In one embodiment, information that is received by port 52 is processed by a receive module 38 and information that is transmitted by port 52 is handled by transmit module 40. The structure of receive module 38 and transmit module 40 depends on the protocol used by adapter 14 for sending and receiving information.

Adapter 14 also includes a direct memory access (DMA) module 42 that is used to access link 30 to send information to and receive information from processor 18 or any other component of computing system 12. Adapter 14 may have other modules shown as 44 and their details are not germane to the embodiments disclosed herein.

Memory 36 of adapter 14 may be accessed by different components/modules of adapter 14, for example, processor 34, the receive module 38, the transmit module 40, DMA module 42, a free list manager 48 and others. Details regarding the free list manager 48 are provided below. The modules that access memory 36 are referred to herein as clients.

Figure 1B:
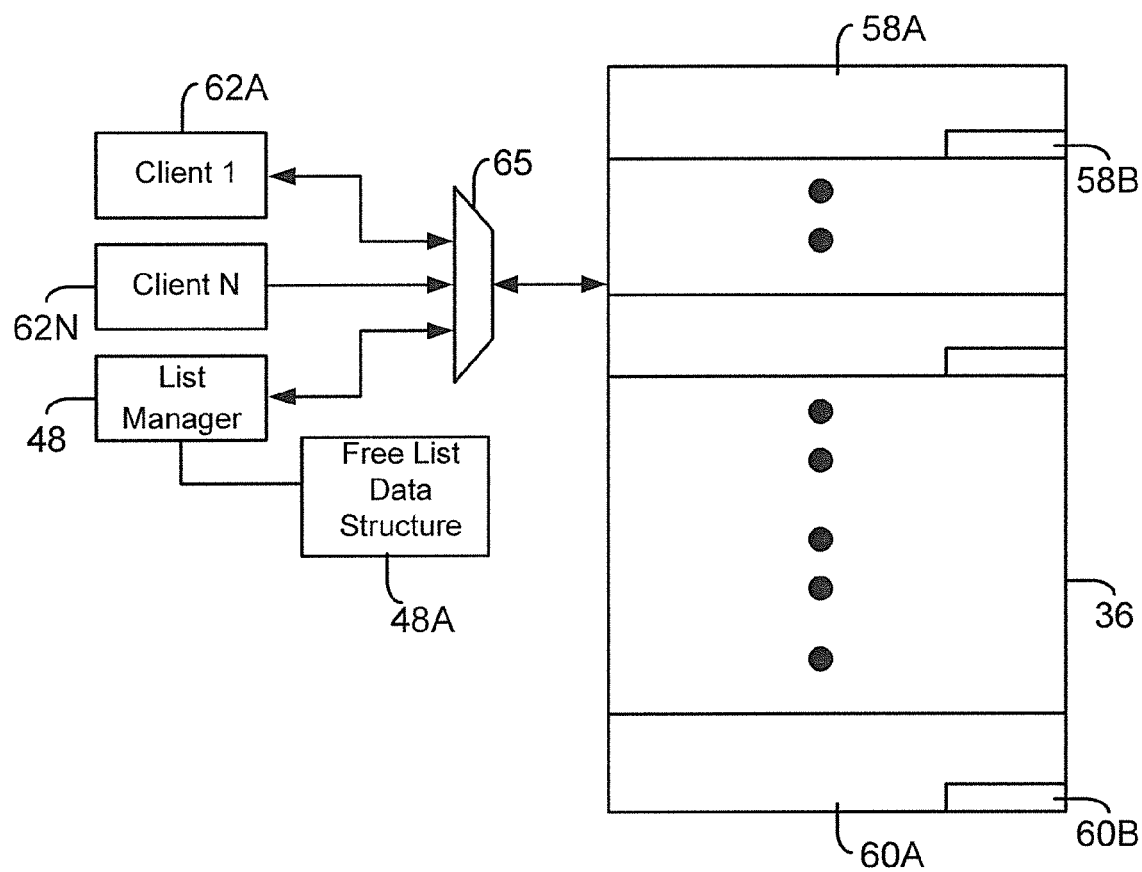
FIG. 1B shows an example of a memory accessible by a plurality of clients and a list manager.

FIG. 1B provides an example of memory 36 that may be accessed by a plurality of clients' 62A-62N and the list manager 48, according to one embodiment. A memory access manager 65 allows clients 62A-62N and list manager 48 to access memory 36 for reading and writing information. The list manager 48 is considered as one of the clients by memory access manager 65. In one embodiment, the list manager 48 is a hardware component, for example, a state machine, a processor, or any other device type. In another embodiment, list manager 48 may be instructions that are executed by a hardware device.

Memory 36 may include a plurality of blocks (or segments) shown as 58-60 that are used to store information. Each block may include sub-blocks, for example, sub-block 58A and 58B for block 58 and sub-blocks 60A and 60B for block 60, respectively. In one embodiment, one sub-block (for example, 58A and 60A) is used for storing information for clients and the other sub-block (for example, 58B and 60B) is used for storing a link. The term link as used herein means a pointer to a "next" block that is available for allocation. For example, sub-block 58B stores a link or pointer to a next block that is free and available for allocation by the list manager 48. The size of sub-block 58B/60B used for storing the link is relatively smaller than sub-block 58A/60A that is used for storing information or data.

To allocate free blocks in memory 36, the list manager maintains a data structure shown as the free list data structure 48A. The free list data structure 48A includes the address of the "first free" block that is available for allocation and a total number of free blocks. Because the list manager 48 maintains the free list data structure 48A it has to frequently access memory 36.

Typically, when a client requests access to a memory block, the list manager 48 checks the free list data structure 48A and then allocates at least one memory block to the client. For example, if client 62A requests a memory block and block 58 is the first free available block, then the list manager 48 allocates block 58 to client 62A. To obtain the address of the next free block, the list manager 48 reads the link stored at sub-block 58B that points to the next available block, for example, 60. The list manager 48 then updates the free list data structure 48A storing the link to block 60 and information regarding the total number of blocks that are available.

In conventional systems, when a client requests memory access, the list manager 48 has to compete with the other clients to access memory 36 even though the list manager 48 accesses a very small memory portion for reading links stored at the various sub-blocks. Because the list manager 48 and the clients 62A-62N compete to access memory 36 overall system performance is affected. For example, until the list manager 48 has completed its access to free a memory block, it cannot be made available to a client.

Figure 1C:
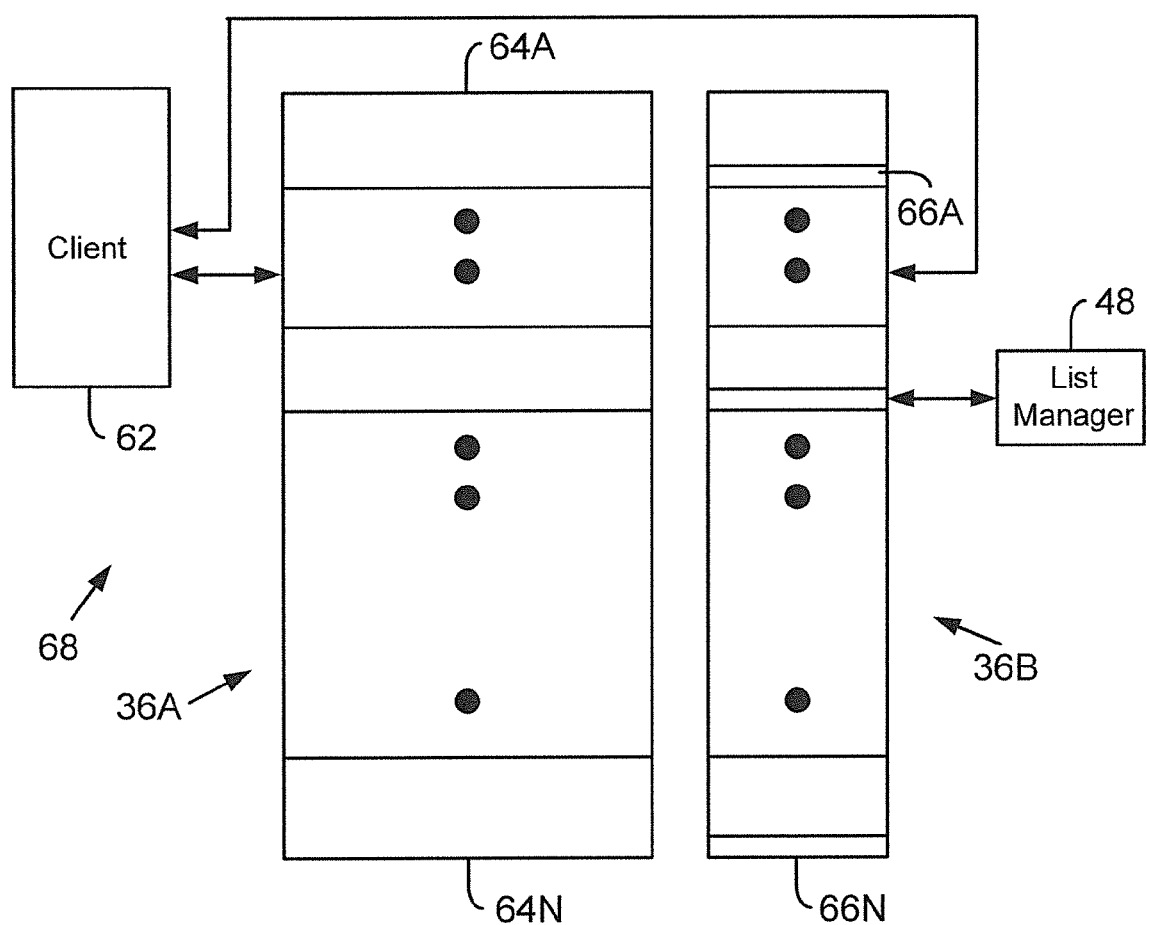
FIG. 1C shows a system for managing memory accessible by a plurality of clients, according to one embodiment.

The embodiments described herein provide a method and system for efficiently allocating memory blocks among a plurality of clients and reducing competition between the list manager 48 and clients' 62A-62N. FIG. 1C shows a system 68 where memory 36 is split into at least two memory slices 36A and 36B. Memory slice 36A is single ported and is only accessible to clients 62A-62N. Memory slice 36A may include various blocks 64A-64N that are used to store client data for clients' 62A-62N. The list manager 48 does not access any of the blocks at memory slice 36A.

In one embodiment, the second memory slice 36B is dual-ported having a plurality of blocks 66A-66N that are used to store links and is accessible to both clients' 62A-62N and the list manager 48. The size of blocks 66A-66N is relatively smaller than the size of blocks 64A-64N used to store client information/data. As an example, the size of blocks 66A-66N is as wide as the size of a link.

A block from among blocks 66A-66N is either owned by a client 62 when allocated by the list manager 48 or by the list manager 48 when it is unallocated. Hence, client 62 and the list manager 48 do not access the same block at the same time. This ensures that the dual ports of memory slice 36B do not enable conflicting access to a same block of memory slice 36B.

System 68 is efficient because memory slice 36A is only accessed by the clients and not by the list manager 48. This allows clients to read and write information without having to compete with list manager 48. Furthermore, after a block from memory slice 36B is allocated to a client, the client can use that block to store client data. This provides additional storage capacity to the client. Because the size of memory slice 36B is smaller than memory slice 36A, the use of two memory slices is not cost prohibitive.

Figure 2:
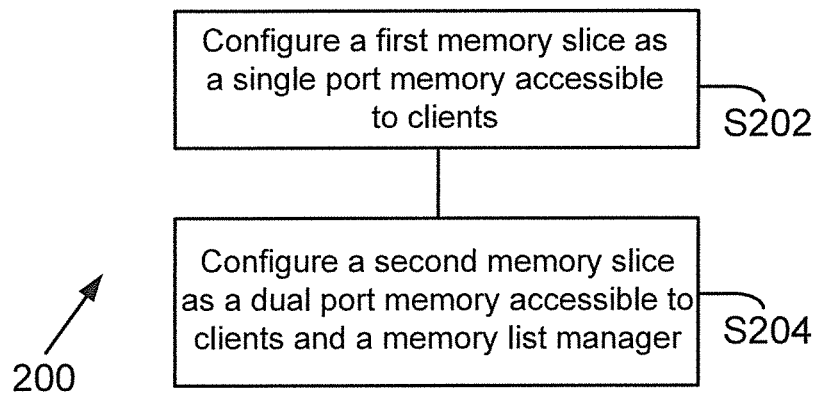
FIGS. 2-4 show process flow diagrams, according to one embodiment.

FIG. 2 shows a configuration process 200 for memory 36, according to one embodiment. Process 200 starts with a configuration step of block S202, when the first, single ported memory slice 36A is provided. As described above, the first memory slice 36A is only accessible to clients' 62A-62N and not to list manager 48.

In block S204, the dual ported, second memory slice 36B that is accessible by both clients' 62A-62N and the free list manager 48 is configured. Each block of the second memory slice 36B is wide enough to at least store a link. The second memory slice 36B is accessible to both clients 62A-62N and list manager 48. However, as described above, a block at memory slice 36B once allocated to a client is not accessed by list manager 48 or any other client. This avoids conflict between the clients and list manager 48.

Figure 3:
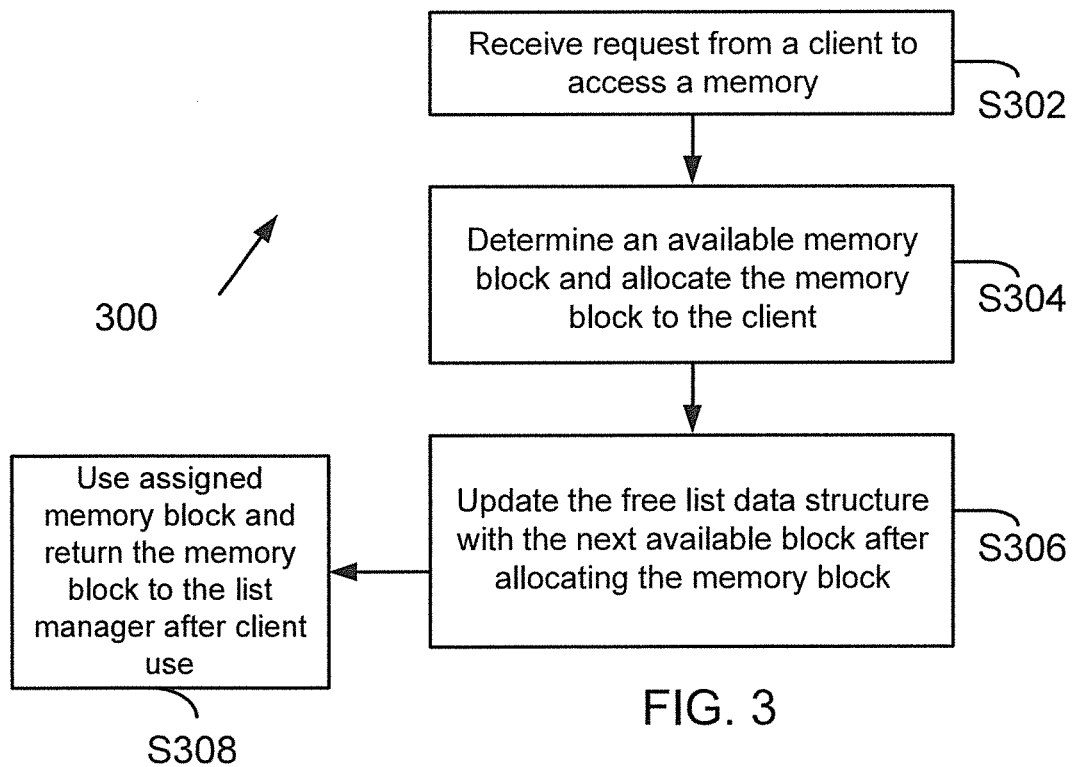

FIG. 3 shows a process flow 300 for allocating memory blocks, according to one embodiment. The process begins in block S302 when a request for a memory block from a client 62A-62N is received by list manager 48. In block S304, the list manager 48 reads the free list data structure 48A to determine the first available memory block of memory slice 36A. The list manager 48 also reads the link stored at memory slice 36B corresponding to the first available block at memory slice 36A. The list manager 48 assigns the first available memory block and then in block S306 updates the free list data structure 48A with the link to the next available block in memory slice 36A.

Referring to FIG. 1C and as an example, assume that block 64A of memory slice 36A is first available memory block. The list manager 48 reads the link stored at block 66A of memory slice 36B to obtain the address of the next available block, which may be 64N. The list manager 48 allocates blocks 64A and 66A to the client in block S304 and then in block S306, updates the free list data structure 48A with a link that points to block 64N the next available block.

In block S308, the client uses the blocks in both memory slices 36A and 36B. Thus during client use, the block from memory slice 36B provides additional storage because it no longer stores a link. After the client is done using the allocated blocks, the client returns the blocks to the list manager 48. The process for handling the returned blocks is described below with respect to FIG. 4.

Figure 4:
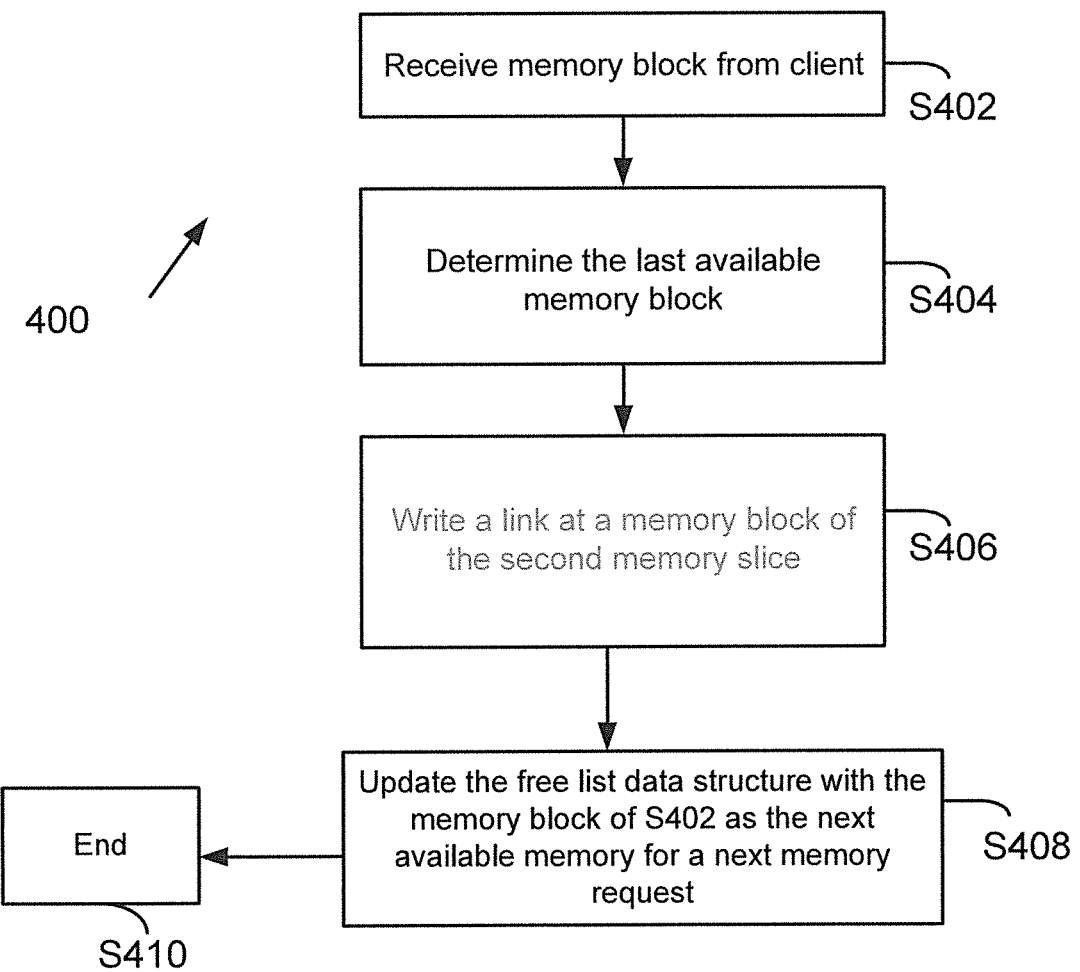

FIG. 4 shows the process 400 for handling a returned memory block, according to one embodiment. As an example, assume that in block S402, the client returns blocks 64A and 66A of memory slice 36A and 36B, respectively. In block S404, the list manager 48 reads the free list data structure 48A to determine the "last" free block of memory slice 36A. Assume that the last free block of memory slice 36A is 64N. In block S406, the list manager 48 writes the link to block 64A at block 66N of memory slice 36B. Thereafter, in block S408, the list manager 48 updates the free list data structure to reflect the last (or the next) available data block. In this example, the next available data block for a next request will be block 64A of memory slice 36A. The process then ends in block S410.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A machine implemented method, comprising:
providing a single-ported memory having a plurality of blocks configured for storing information and only accessible to a plurality of clients;
configuring a dual-ported memory having a plurality of blocks for storing links and accessible to the plurality of clients and to a list manager that maintains a data structure for allocating memory blocks from the first memory and the second memory to the plurality of clients; wherein the dual-ported memory is accessible to both the plurality of clients and the list manager;
receiving a request from a client for access to memory storage at the single-ported memory and the dual-ported memory; and
allocating a block of the single-ported memory to the client and a block of the dual-ported memory to the client;
wherein after the client has used the memory storage, the allocated block of the single-ported memory and the dual-ported memory are released to a free list data structure used by the list manager to assign storage.

2. The method of claim 1, further comprising storing a link for a next available memory block at the dual-ported memory; wherein the list manager allocates the block of the single-ported memory and stores the link at the dual-ported memory.

3. The method of claim 1, wherein the plurality of clients are hardware modules of an adapter coupled to a computing system.

4. The method of claim 3, wherein the single-ported memory and the dual-ported memory are located at the adapter.

5. The method of claim 3, wherein the adapter is configured to send and receive network information using a network protocol.

6. The method of claim 3, wherein the adapter is configured to send and receive information complying with a storage protocol.

7. The method of claim 3, wherein the adapter is configured to send and receive information complying with a protocol that can handle both network and storage information.

8. A machine implemented method, comprising:
receiving a request from a client from among a plurality of clients for access to memory storage at a single-ported memory and a dual-ported memory;
wherein the single-ported memory is accessible only to the plurality of clients and includes a plurality of blocks configured for storing information on behalf of the plurality of clients;
wherein the dual-ported memory includes a plurality of blocks for storing links, and is accessible to the plurality of clients and to a list manager that maintains a data structure for allocating memory blocks from the single-ported memory and the dual-ported memory to the plurality of clients; and
allocating a block of the single-ported memory and a block of the dual-ported memory to the client; and
storing a link for a next available memory block at the dual-ported memory; wherein the list manager allocates the block of the single-ported memory and stores the link at the dual-ported memory.

9. The method of claim 8, wherein after the client has used the memory storage, the allocated block of the single-ported memory and the dual-ported memory are released to the data structure used by the list manager to allocate storage.

10. The method of claim 8, wherein the plurality of clients are hardware modules of an adapter coupled to a computing system.

11. The method of claim 10, wherein the single-ported memory and the dual-ported memory are located at the adapter.

12. The method of claim 10, wherein the adapter is configured to send and receive network information using a network protocol.

13. The method of claim 10, wherein the adapter is configured to send and receive information complying with a storage protocol.

14. The method of claim 10, wherein the adapter is configured to send and receive information complying with a protocol that can handle both network and storage information.

15. A device, comprising:
a single-ported memory accessible only to a plurality of clients, the single-ported memory including a plurality of blocks configured for storing information on behalf of the plurality of clients; and
a dual-ported memory having a plurality of blocks for storing links, the dual-ported memory being accessible to the plurality of clients and to a list manager that maintains a data structure for allocating memory blocks from the single-ported memory and the dual-ported memory to the plurality of clients; wherein in response to a client request, the list manager allocates a block of the single-ported memory and a block of the dual-ported memory to the client, and stores a link for a next available memory block at the dual-ported memory.

16. The device of claim 15, wherein the plurality of clients are hardware modules of an adapter coupled to a computing system.

17. The device of claim 16, wherein the single-ported memory and the dual-ported memory are located at the adapter.

18. The device of claim 16, wherein the adapter is configured to send and receive network information using a network protocol.

19. The device of claim 16, wherein the adapter is configured to send and receive information complying with a storage protocol.

20. The device of claim 16, wherein the adapter is configured to send and receive information complying with a protocol that can handle both network and storage information.

* * * * *

UNITED STATES PATENT AND TRADEMARK OFFICE
CERTIFICATE OF CORRECTION

PATENT NO. : 8,918,593 B2  Page 1 of 1
APPLICATION NO. : 14/036920
DATED : December 23, 2014
INVENTOR(S) : Khandai et al.

It is certified that error appears in the above-identified patent and that said Letters Patent is hereby corrected as shown below:

In the Specification

In column 3, line 27, delete "system" and insert -- system 10 --, therefor.

In column 4, line 20, delete "interface" and insert -- interface 32 --, therefor.

In column 5, line 16, delete "maintains" and insert -- 48 maintains --, therefor.

Signed and Sealed this
Twenty-sixth Day of May, 2015

Michelle K. Lee
*Director of the United States Patent and Trademark Office*